(No Model.) 3 Sheets—Sheet 3.
H. H. FRANZEN & R. HASCHEMEYER.
CULTIVATOR.
No. 554,117. Patented Feb. 4, 1896.
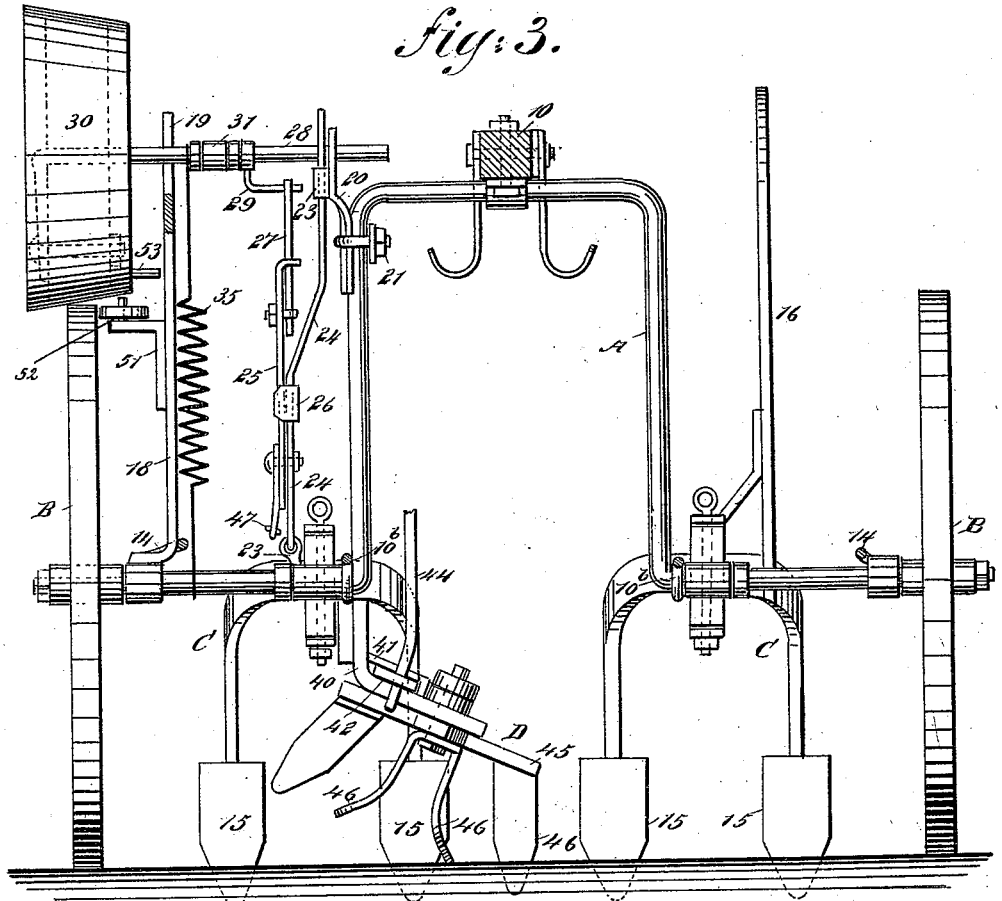
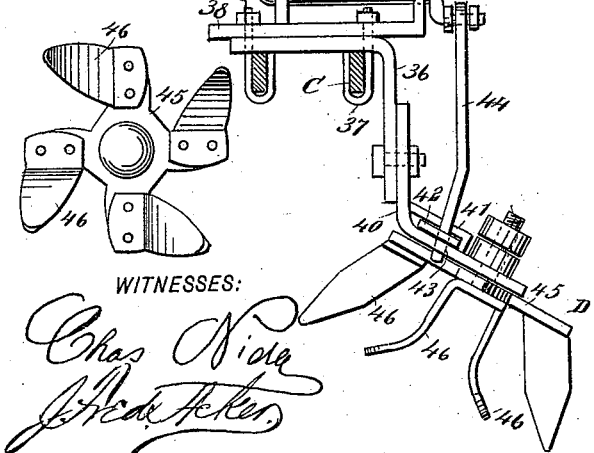
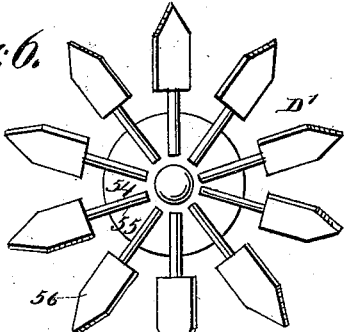
WITNESSES:
INVENTORS:
H. H. Franzen
R. Haschemeyer
BY Munn & Co.
ATTORNEYS.

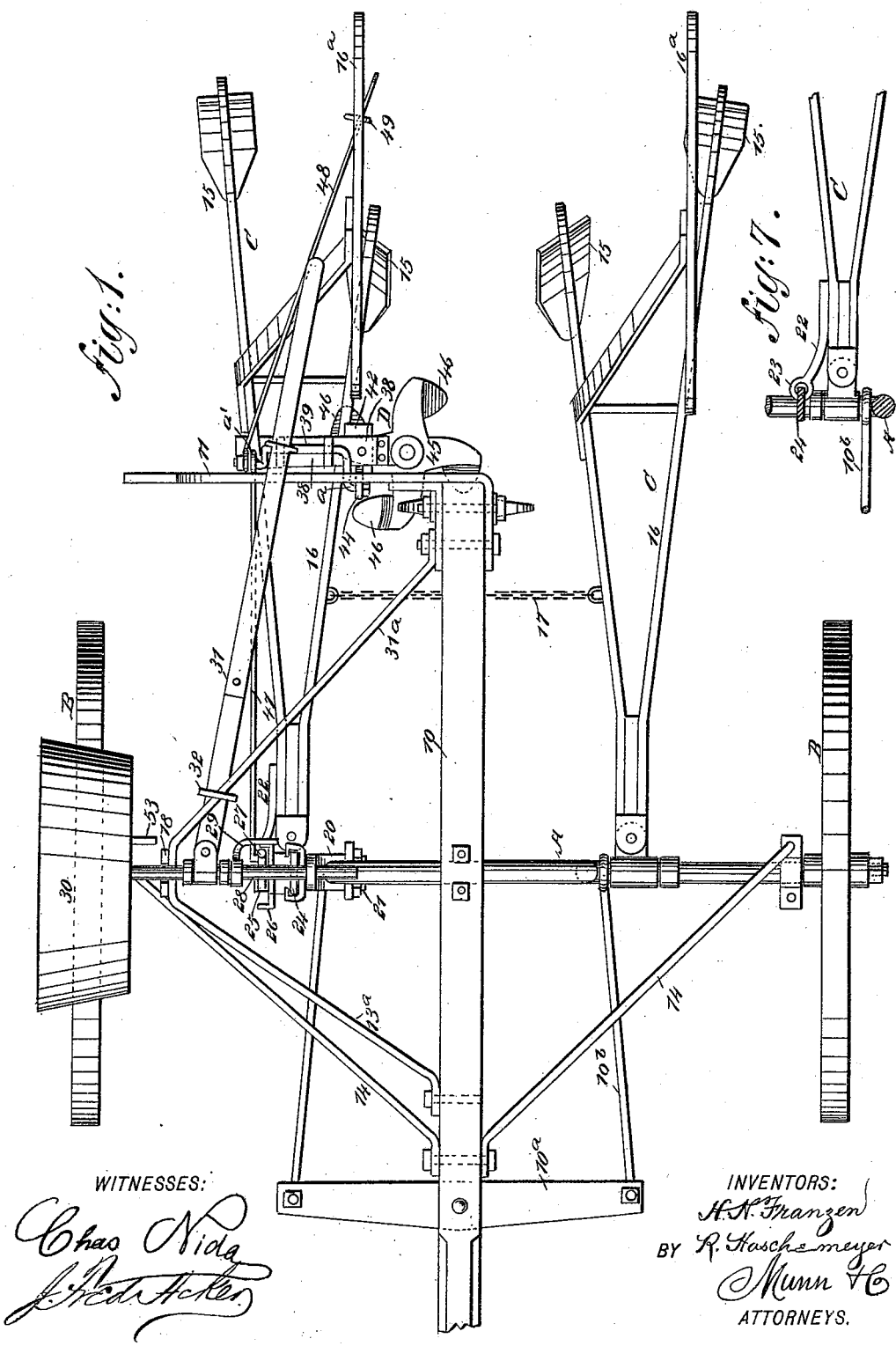

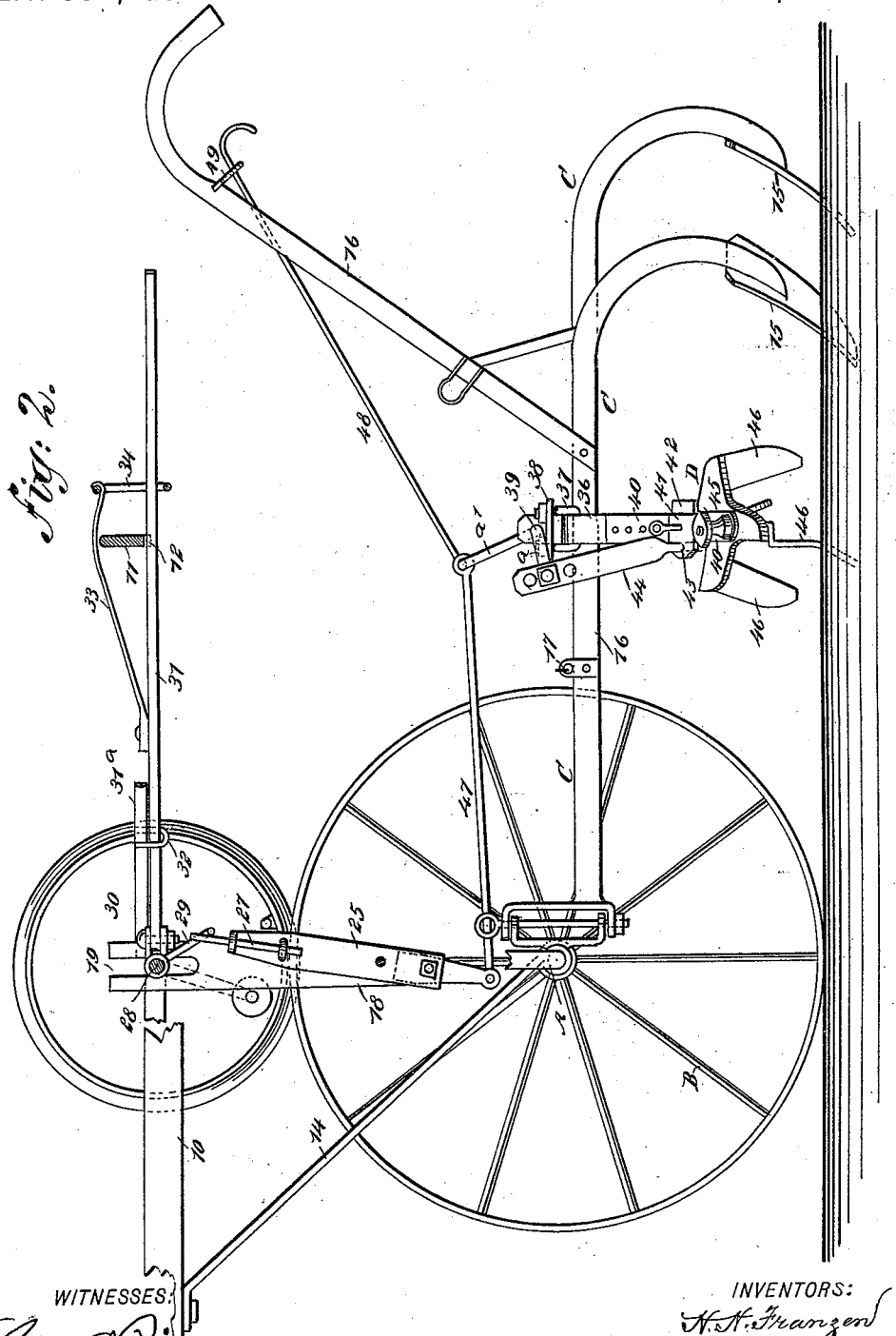

UNITED STATES PATENT OFFICE.

HARM H. FRANZEN AND RUDOLPH HASCHEMEYER, OF GOLDEN, ILLINOIS.

CULTIVATOR.

SPECIFICATION forming part of Letters Patent No. 554,117, dated February 4, 1896.

Application filed March 20, 1895. Serial No. 542,479. (No model.)

*To all whom it may concern:*

Be it known that we, HARM H. FRANZEN and RUDOLPH HASCHEMEYER, of Golden, in the county of Adams and State of Illinois, have invented a new and Improved Cultivator, of which the following is a full, clear, and exact description.

Our invention relates to an improvement in cultivators; and it has for its object to provide a cultivator which will destroy the weeds in the hills of corn or other plants being cultivated by means of the machine, the machine being passed over the ground but once and in one direction, a check-row not being required in planting, since the plants need not be in squares.

A further object of the invention is to so construct the cultivator that it may be adjusted to the requirements of the field, and whereby also without stopping the machine the weeding-cultivators may be made to come into action or retarded to permit the weeding-cultivators to pass around or between plants that are out of proper alignment or that have been spaced a greater or a less distance apart than others in the same row.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1 is a plan view of the machine. Fig. 2 is a vertical section taken through the driving-shaft and between the actuating-lever for the weeding-cultivator and its support. Fig. 3 is a front elevation, a portion of the tongue of the machine being in section. Fig. 4 is a detail side elevation of the weeding-cultivator and its support, the beams of one gang of ordinary cultivators upon which it is placed being shown in section. Fig. 5 is a bottom plan view of the weeding-cultivator. Fig. 6 is a similar view of a slightly-modified form of cultivator, and Fig. 7 is a detail view of a support for the lower end of the supporting-standard of the actuating-lever for the weeding-cultivator.

In carrying out the invention the axle A of the cultivator is an arched axle and is provided with horizontal limbs at the lower ends of the arch, upon which the ground-wheels B are mounted. The pole or tongue 10 is secured in any suitable or approved manner upon the upper portion of the arched axle and is provided at a suitable distance from its outer end with a cross-bar $10^a$, supported at its ends from the arched axle by brace-rods $10^b$.

A cross-bar 11 is secured to the rear end of the tongue or pole 10 and is made to extend in direction of the right-hand side of the machine, the said cross-bar being provided with any desired number of notches 12 therein. Therefore it may be termed a "rack-bar." The pole at or near its connection with this cross-bar $10^a$ is strengthened by braces 14, which lead down to the axle A. Two gangs of cultivators C are pivotally connected with the axle, being located one gang at each side of the arch thereof, and the gangs are usually connected by a chain 17, each gang comprising two or more shanks 16, connected where they are attached to the axle, the outer beam of each gang being the longest, and each beam is provided with a cultivator-shovel 15 of any approved type securely attached thereto, and each gang of cultivator-blades is provided with an upwardly and rearwardly extending handle $16^a$.

Adjacent to the right-hand ground-wheel a standard 18 is rigidly secured upon the horizontal portion of the axle, and this standard extends a predetermined distance above the top of the ground-wheel and is provided with an open bearing 19 at its upper end. A short standard 20 is adjustably secured to the right-hand limb of the arched axle near the top, and the said standard 20 is provided likewise with an open bearing and is opposite the bearing in the fixed standard 18.

The short standard 20 is secured to the arched axle through the medium of a clip 21 or the equivalent thereof, and, as shown in Fig. 7, a bracket 22 is attached to the outer face of the right-hand beam of the right-hand gang of the cultivators, terminating at its rear end in an eye 23, with which eye the lower end of a standard 24 is secured, and said standard is carried upward vertically a predetermined distance, as shown in Fig. 3, and then inwardly to a sliding connection with the outer face of the short standard 20. The sliding standard 24 is provided with an open bearing in its upper end registering with that in the standard 20.

A lever 25 is fulcrumed preferably between its center and lower end upon the outer face of the sliding standard 24, as shown in Fig. 2, the lateral movement of the lever being limited by ears 26, formed upon the sides of the said standard 24. At the upper end of the lever 25 a pin 27 is adjustably secured, and in the bearings of the standards 18, 20 and 24 a shaft 28 is journaled, and said shaft extends outward over the right-hand ground-wheel. A trip-finger 29 is secured upon this shaft, preferably angular in general contour, the trip-finger being adapted at each revolution of the shaft to engage with the pin 27 connected with the lever 25, and at the extreme outer end of the said shaft 28 a cone-pulley 30 is rigidly attached in any suitable or approved manner, adapted for frictional engagement with the periphery of the right-hand ground-wheel and to receive motion therefrom. The shaft 28 is shifted endwise through the medium of a lever 31 attached to the shaft and fulcrumed at 32 upon the forward portion of a horizontal brace-rod $31^a$ located at the top of the machine and attached to the tongue, as shown in Figs. 1 and 2. This lever is adapted to engage with the lower or rack surface of the rear cross-bar 11, and is held in engagement with this surface by means of a spring 33, which is secured to the lever, and is preferably made to pass upward and rearward over the top of the cross-bar, terminating in a link 34 at its rear end, through which the lever passes. By moving this lever, which is adjacent to the driver's seat, either the smaller or the larger circumference of the cone-pulley carried by the shaft may be brought in engagement with the periphery of the drive-wheel and the driving-shaft 28 be driven faster or slower.

When the lever is carried to the extreme outer end of the rack-bar 11 the cone-pulley will be carried inward to such an extent that it will not engage with the ground-wheel, and consequently will be silenced, and in order to prevent the ground-wheel from wabbling a friction-wheel 52 engages with its inner face, being mounted upon a bracket 51 attached to the outer fixed standard 18; and the said cone-pulley is provided upon its inner face with a pin 53, which, when the pulley is in its inner position, will strike a side edge of the said standard 18, and at that time the trip-arm 29 carried by the shaft will be in position to immediately engage with the pin of the lever 25 to actuate the same.

The shaft 28 is held properly seated in its bearing by means of a spring 35 which is secured to the said shaft and to the axle, as shown in Fig. 3. Thus the shaft will not be affected by any obstruction in the path of the ground-wheels or by inequalities in the ground.

At a predetermined point on the right-hand gang of cultivators an angle-bar 36 is secured by means of clips 29 or otherwise to the beams of the said gang, as shown in Fig. 4, and one member of the said angle-bar extends downward at the inside of the gang. The said clips 37 likewise serve to secure upon the horizontal member of the angle-bar or rest-bar 36 a second bar 38, provided with bearings $38^a$, in which a crank-shaft 39 is journaled, the said crank-shaft being provided at its inner end with a crank-arm $a$, and at its outer end with a longer crank-arm $a'$.

A second angle-bar 40 is adjustably secured to the vertical member of the angle rest-bar 36. The members of the second angle-bar 40 are not at right angles to each other, being at an angle of about forty-five degrees, whereby the lower member of the adjustable angle-bar 40 is given a decided downward and outward inclination in direction of the left-hand side of the machine.

A strap 41 is secured upon the upper end of the lower portion of the adjustable angle-bar 40, which angle-bar is really a shank for a weeding-cultivator D; and in said strap a bar 42 is secured, through the medium of a pin or its equivalent, as shown in Fig. 2, and one end of the said bar is made to extend forwardly beyond the said strap, its forward end being provided with an aperture 43, through which the lower and reduced end of a stop-bar 44 is made to loosely pass, the upper end of the stop-bar being adjustably connected with the smaller crank $a$ of the crank-shaft 39.

The weeding-cultivator D is placed exactly between the hills, and it comprises a body 45 of cruciform shape, consisting ordinarily of a hub and four arms radiating therefrom, and a cultivator-tooth 46 is secured to each of the arms of the body 45, being carried downward at an angle thereto, substantially a right angle, and the lower ends of the cultivator-teeth are transversely curved and given a slight twist all in the same direction.

It will be observed that owing to the slant of the weeding-cultivator, by reason of the acute angularity of its supporting-shank 40, but one of the teeth—that in direction of the left-hand side of the machine—will engage with the ground, the others being practically out of the ground.

A pitman 47 is pivotally connected with the lower end of the lever 25, which is operated from the drive-shaft 28, and the said pitman is connected with the longer crank-arm $a'$ of the said crank-shaft 39. Each time that the trip-arm 29 of the drive-shaft engages with the lever 25 to rock the same, through the medium of the pitman 47 the crank-arm 39 will be rocked, and the stop-bar 44 will be drawn upward out of engagement with the hub portion of the cultivator-body 45, as it is normally in engagement with the hub between two of the arms, and when the stop-bar is thus raised the weeding-cultivator D will be free to revolve. The moment, however, that the lever 25 disconnects from the trip-arm 29 a spring 50 will draw the crank-arm $a'$ forward to its normal position and carry the stop-bar again to an engagement with the cultivator-body.

When necessary the weeding-cultivator may be released from the stop-bar by means of a hand-lever 48 attached to the crank-arm $a'$ of the crank-shaft, and extending rearward through a suitable guard 49 at the rear of the right-hand cultivator-handle. The diameter of the cone or driving-pulley 30 should correspond to the distance between the hills, and as heretofore stated the weeding-cultivator must be placed so that it will travel exactly between the hills. The prime object of this invention is to cultivate a field of corn or other plants at one passage of the cultivator in a manner which will leave the field practically the same as when it was cultivated lengthwise or crosswise, with this exception, that the gutters or ridges will not be interfered with or broken up, and the water will properly reach the roots.

As the machine advances the ordinary cultivating-blades operate in the usual manner, cultivating the ground at each side of a row of hills, while the weeding-cultivator will cultivate the ground crosswise adjacent to each plant and effectually eradicate all of the weeds. This is accomplished as follows: In starting the machine the pin 53 of the driving-pulley (said pulley having been drawn inward) is in engagement with the standard 18. The lower prong or tooth of the weeding-cultivators will now be brought close to the first hill, the driving-cone will be carried outward, the machine started and the drive-shaft will be set in rotation, and immediately the trip-arm 29 will act upon the lever 25, causing the said lever, through its connection with the stop-bar 44, to release the weeding-cultivator, permitting it to turn. It is therefore evident that as the machine advances the cultivator-tooth 46 that is in the ground will work around the plant, cultivating it at the side and connecting with the furrows turned up by the ordinary cultivator-blades 15. Just as the cultivator-tooth 46, which is in working position, has cleared the plant the next tooth will have been brought in position in front of the plant to operate on the next plant in advance, and at that time the stop-bar 44 will have been forced downward to an engagement with the cultivator-body 45, preventing the rotation of the latter, to be again withdrawn the moment that the tooth in action closely approaches the next plant ahead, and should the plant be out of alignment at any time, or should the distance between the plants be unequal, the weeding-cultivator can be immediately brought into action or stopped by manipulating the hand-lever 48.

It will be understood that any desired number of arms 29 may be employed on the shaft 28 demanded by the distance between the plants in a row.

The auxiliary cultivator may be varied in shape—as, for example, as shown in Fig. 6, it may consist of a disk-body 54, arms 55 projected from the body, and teeth 56 attached to the outer extremities of the arms at an angle to the ground, each tooth presenting more or less of its side surface to the ground, whereby a greater number of teeth may be employed than under the arrangement shown in Fig. 5, and the entire cultivator is more on the order of a wheel.

The apertures in the angle-bars 36 and 40 may be employed as brake-pin holes, a lower hole being adapted to receive a bolt and an upper hole a wooden pin.

Having thus described our invention, we claim as new and desire to secure by Letters Patent—

1. In a cultivator, teeth capable of rotating by contact with the ground, and checking mechanism capable of stopping the rotation of the teeth, said mechanism being periodically operated by motion derived from the moving parts of the cultivator, substantially as described.

2. The combination, with a cultivator-beam, of an auxiliary cultivator rotatably mounted and driven by contact with the ground, said cultivator comprising a frame having an inclination downwardly in direction of one side and attached to the said beam in a manner to pass between hills, and mechanism for periodically interfering with the auxiliary cultivator and for stopping the movement thereof, as and for the purpose specified.

3. In a wheeled cultivator, the combination, with a wheeled support, the beam and the cultivator-blades, of an auxiliary cultivator located to pass between the hills, comprising a rotatable body having an inclination downward and in direction of one side, and teeth projected downward from the said body in substantially cruciform arrangement, a drive-shaft driven from one of the ground-wheels of the machine, a stop-pin adapted to hold the rotatable cultivator stationary, a lever, a crank-and-pitman connection between the lever and the stop-pin, and means for tripping the lever from the drive-shaft, substantially as shown and described.

4. In a cultivator, the combination, with the ground-wheels, the beams and shares, an adjustable drive-shaft, a conical driving-pulley carried by the shaft and adapted for frictional engagement with the ground-wheels, and a shifting device for the said shaft, of a rotatable auxiliary cultivator located to travel between the hills and supported from the said beams, the auxiliary cultivator being given a downward and outward inclination and the teeth being at an angle to the body, a lever, a stop adapted to check the rotation of the rotatable cultivator, means for releasing the said stop from the lever, and a trip operated from the drive-shaft and operating on said lever, substantially as and for the purpose set forth.

5. In a cultivator, the combination with the axle-supporting wheels, of a shaft revolubly mounted above one wheel, a friction-drum fixed to the shaft and capable of engagement with the periphery of said supporting-wheel, the drum being conical in form and disposed with its largest portion outward, it being adapted to be drawn inwardly to bind against the wheel, a roller revolubly mounted at the inner side of the wheel-rim and bearing against the same, whereby the correct position of the wheel is preserved, a rotatable tooth-carrying frame, and mechanism operated by the revoluble shaft whereby the movements of the tooth-carrying frame may be suppressed, substantially as described.

6. In a cultivator, the combination, with the axle and supporting-wheels thereof, of a revoluble shaft mounted adjacent to one wheel, a friction-drum mounted upon the shaft and capable of engagement with the supporting-wheel, whereby the shaft is rotated, a tripping-arm fixed to the shaft and rotating therewith, a lever fulcrumed on a rigid portion of the frame and having its upper end engaged by the trip-arm as the same revolves, a rod connected to the lower end of the lever, a rock-shaft to which the said rod is also connected, a plunger-bar connected to the rock-shaft and reciprocated thereby, and a revoluble tooth-carrying frame given motion by contact with the ground and arranged with parts in line with the lower end of the plunger-bar when said bar is moved to the limit of its downward stroke, substantially as described.

7. In a cultivator, the combination with a main frame, of a tooth-frame revolubly mounted on the main frame and having a diagonal axis, and teeth carried by said tooth-frame, the disposition of the tooth-frame and its teeth being such that its dipping side will engage with the ground and be revolved by contact therewith, substantially as described.

HARM H. FRANZEN.
RUDOLPH HASCHEMEYER.

Witnesses:
ROOLF W. BUSS,
MENNE GRONEWOLD.